United States Patent Office 3,471,526
Patented Oct. 7, 1969

3,471,526
(OPTIONALLY 17-ALKYLATED) 1β-METHYL-5α-ANDROSTANE-1α,17β-DIOLS, Δ² DERIVATIVES CORRESPONDING AND ESTERS THEREOF
Paul D. Klimstra, Northbrook, Ill., assignor to G. D. Searle & Co., Chicago, Ill., a corporation of Delaware
No Drawing. Filed Mar. 6, 1967, Ser. No. 620,616
Int. Cl. C07c *169/20, 169/22;* A61k *17/00*
U.S. Cl. 260—397.4          10 Claims

ABSTRACT OF THE DISCLOSURE

Novel pharmacologically useful steroid derivatives characterized by anabolic, androgenic and antiestrogenic properties and by a 1α-hydroxy-1β-methyl function. These novel compounds are prepared by reaction of a methyl organometallic reagent with the 1-keto or the 1,17-diketo starting material, subsequent oxidation of the 17-hydroxy function to afford the corresponding 17-keto compounds, acylation to yeild the desired esters and, alternatively, reduction of the Δ² derivatives to produce the saturated A-ring compounds.

The present invention is concerned with novel steroidal derivatives characterized by a 1α-hydroxy-1β-methyl moiety and, in particular, with (optionally 17-alkylated) 1β-methyl-5α-androstane-1α,17β-diols, Δ² derivatives corresponding and esters thereof represented by the following structural formula

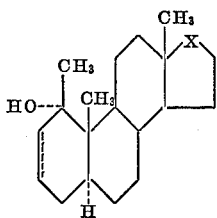

In that representation X is symbolic of a carbonyl or radical of the formula

wherein Z can be hydrogen or a lower radical, Y is hydrogen when Z is lower alkyl, Y can be hydrogen or lower alkanoyl when Z is hydrogen and the dotted line indicates the optional presence of a 2,3-double bond.

The lower alkyl radicals denoted by Z are typified by methyl, ethyl, propyl, butyl, pentyl, hexyl, heptyl and the branched chain radicals thereof.

Representative of the lower alkanoyl radicals encompassed by Y are formyl, acetyl, propionyl, butyryl, valeryl, caproyl, heptanoyl, and the branched chain groups isomeric therewith.

The instant compounds are conveniently produced by processes involving the use as starting materials of the 1-keto compounds described in U.S. Patent 3,257,428 and emcompassed by the following structural formula

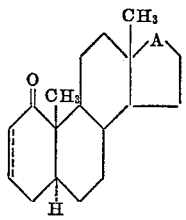

A being a carbonyl, β-hydroxymethylene or α-(lower alkyl)-β-hydroxymethylene group and the dotted line indicating an optional 2,3-double bond.

When a suitable 1-keto starting material is contacted with a methyl organometallic reagent, the instant novel compounds are produced. A particularly suitable process is specifically illustrated by the reaction of 17β-hydroxy-5α-androstan-1-one with methyl magnesium bromide in tetrahydrofuran at the reflux temperature to afford, after hydrolysis of the Grignard adduct, 1β-methyl-5α-androstane-1α,17β-diol.

The instant 17-keto compounds are conveniently obtained by oxidation of the corresponding 17-hydroxy substances. The aforementioned 1β-methyl-5α-androstane-1α,17β-diol, for example, is contacted with aqueous chromic acid in acetone to yield 1α-hydroxy-1β-methyl-5α-androstan-17-one.

Acylation of the instant 17-hydroxy compounds affords the correpsonding 17-(lower alkanoates). As a specific example, 1β-methyl-5α-androstane-1α,17β-diol is contacted with acetic anhydride and pyridine to produce 1β-methyl-5α-androstane-1α,17β-diol 17-acetate.

An alternate method for production of the instant saturated A-ring compounds involves catalytic reduction of the corresponding instant Δ² derivatives. A convenient method is exemplified by the hydrogenation of 1β,17α-dimethyl-5α-androst-2-ene-1α,17β-diol in ethanol at elevated temperature and pressure in the presence of a catalytic quantity of ruthenium oxide to yield, 1β,17α-dimethyl-5α-androstane-1α,17β-diol.

The compounds of the present invention exhibit valuable pharmacological properties. They are hormonal and anti-hormonal agents, for example, as is demonstrated by their anabolic, androgenic and anti-estrogenic properties. They possess, furthermore, the particular advantages of lacking side-effects, i.e., progestational and estrogenic, displayed by related hormonal compositions.

The invention will appear more fully from the examples which follow. These examples are given by way of illustration only and are not to be constructed as limiting the invention either in spirit or in scope as many modifications both in materials and methods will be apparent to those skilled in the art. In these examples temperatures are given in degrees centigrade (° C.) and quantities are expressed in parts by weight unless otherwise noted.

Example 1

To a stirred solution containing 125 parts by volume of ethereal 3 M methyl magnesium bromide dissolved in 90 parts of tetrahydrofuran is added a solution of 5 parts of 17-β-hydroxy-5α-androstan-1-one in 90 parts of tetrahydrofuran. The ether is removed by distillation and the residual reaction mixture is heated at the reflux temperature for about 16 hours, then cooled and poured carefully into a mixture of saturated aqueous ammonium chloride and ice. Extraction of that aqueous mixture with ether affords an organic extract, which is washed several times with water, then dried over anhydrous sodium sulfate containing decolorizing carbon. Distillation of the solvent under reduced pressure affords the solid crude product, which is purified by recrystallization from aqueous methanol to yield 1β-methyl-5α-androstane-1α,17β-diol, melting at about 178–180°. It is characterized further by an optical rotation, in chloroform, of +31° and by the following structural formula

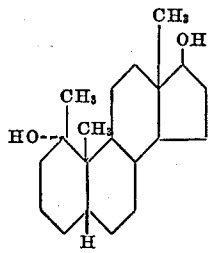

Example 2

To a stirred solution containing 100 parts by volume of 3 M methyl magnesium bromide dissolved in 90 parts of tetrahydrofuran is added a solution of 4 parts of 17β-hydroxy-5α-androst-2-en-1-one in 90 parts of tetrahydrofuran. The ether is removed by distillation and the remaining solution is heated at the reflux temperature for about 16 hours, then cooled and poured into a mixture of ice and water. Acidification with 10% hydrochloric acid results in formation of an oil which solidifies upon standing and cooling. The solid product is isolated by decantation, then is extracted with ether. The resulting ether solution is washed with water, dried over anhydrous sodium sulfate containing decolorizing carbon, then stripped of solvent by distillation under reduced pressure. The oily residue is recrystallized from aqueous acetone to afford pure 1β-methyl-5α-androst-2-ene-1α,17β-diol, melting at about 165–167°. It displays an optical rotation, in chloroform, of +73.5° and is represented by the following structural formula

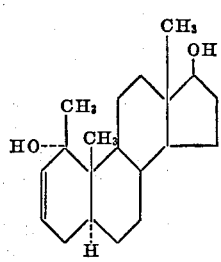

Example 3

A solution of 1.1 parts of 17β-hydroxy-17α-methyl-5α-androstan-1-one in 27 parts of tetrahydrofuran is added in one portion to a solution containing 30 parts of 3 M methyl magnesium bromide dissolved in 27 parts of tetrahydrofuran. The resulting reaction mixture is distilled in order to remove ether, then is heated at the reflux temperature for about 16 hours. That mixture is poured into ice and saturated aqueous ammonium chloride and the resulting oil is extracted with ether. The resulting organic solution is washed successively with water and 5% aqueous sodium bicarbonate, then dried over anhydrous potassium carbonate containing decolorizing carbon. Distillation of the solvent under reduced pressure affords a glass-like residue which is purified by recrystallization from acetone-hexane to afford pure 1β,17α-dimethyl-5α-androstane-1α,17β-diol, melting at about 180–182.5°. An optical rotation, in chloroform, of −72.5° is observed.

This compound is represented by the following structural formula

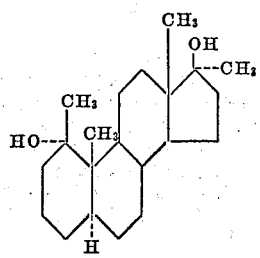

Example 4

To a solution of 3 parts of 17β-hydroxy-17α-methyl-5α-androst-2-en-1-one in 68 parts of tetrahydrofuran is added a solution containing 75 parts by volume of 3 M methyl magnesium bromide dissolved in 68 parts of tetrahydrofuran. Removal of the ether by distillation under reduced pressure affords the reaction mixture which is heated at the reflux temperature for about 16 hours. It is then poured into ice and saturated aqueous ammonium chloride. The resulting precipitate is collected by filtration, washed on the filter with 5% aqueous sodium bicarbonate, then recrystallized from acetone to yield 1β,17α-dimethyl-5α-androst-2-ene-1α,17β-diol, melting at about 222–223° and exhibiting an optical rotation, in chloroform, of +51°.

Example 5

To a solution of 2 parts of 1β-methyl-5α-androstane-1α,17β-diol in 20 parts of acetone is added dropwise an aqueous solution, 8 N in chromium trioxide and 8 N in sulfuric acid, until the oxidant is present in excess. A small quantity of isopropyl alcohol is added at that point in order to destroy the excess reagent. The resulting mixture is poured into ice and water and the precipitated crude product is collected by filtration, washed with water, then dried in air. Recrystallization of that crude product from methanol containing decolorizing carbon results in pure 1α-hydroxy-1β-methyl-5α-androstan-17-one, melting at about 195–197°. It exhibits an optical rotation, in chloroform of +111° and is characterized further by the following structural formula

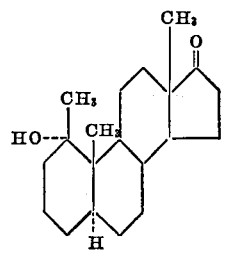

Example 6

To a solution of 1 part of 1β-methyl-5α-androst-2-ene-1α,17β-diol in 12 parts of acetone is added with stirring an aqueous solution, 8 N in chromium trioxide and 8 N in sulfuric acid, until the orange color of the reagent persists. The excess reagent is destroyed by the addition of a small quantity of isopropyl alcohol and the precipitated inorganic salts are removed by filtration through diatomaceous earth. The resulting filtrate is concentrated partially, then is diluted with water and cooled. Needle-like crystals of the crude product are isolated by filtration, then purified by recrystallization from aqeous acetone to yield pure 1α-hydroxy-1β-methyl-5α-androst-2-en-17-one, melting at about 113–116°. It exhibits an optical rotation, in chloroform, of +149° and is represented by the following structural formula

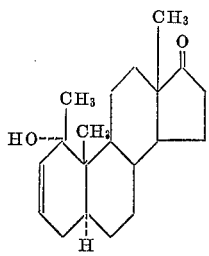

Example 7

By substituting an equivalent quantity of 17α-ethyl-17β-hydroxy-5α-androstan-1-one and otherwise proceeding according to the processes described in Example 3, there is produced 17α-ethyl-1β-methyl-5α-androstane-1α,17β-diol.

Example 8

The substitution of an equivalent quantity of 17α-ethyl-17β-hydroxy-5α-androst-2-en-1-one in the procedure of Example 4 results in 17α-ethyl-1β-methyl-5α-androst-2-ene-1α,17β-diol.

Example 9

A solution containing 1 part of 1β-methyl-5α-androstane-1α,17β-diol, 10 parts of acetic anhydride and 20 parts of pyridine is stored at room temperature for about 16 hours, then is cooled and poured carefully into a large volume of water. Extraction of that aqueous mixture with benzene affords an organic solution, which is dried over anhydrous magnesium sulfate and concentrated to dryness under reduced pressure, thus affording 1β-methyl-5α-androstane-1α,17β-diol 17-acetate.

Example 10

By substituting an equivalent quantity of 1β-methyl-5α-androst-2-ene-1α,17β-diol and otherwise proceeding according to the process described in Example 9, there is produced 1β-methyl-5α-androst-2-ene-1α,17β-diol 17-acetate.

Example 11

When an equivalent quantity of propionic anhydride is substituted in the procedure of Example 9, there is obtained 1β-methyl-5α-androstane-1α, 17β-diol 17-propionate.

Example 12

The reaction of equivalent quantities of 1β-methyl-5α-androst-2-ene-1α,17β-diol and propionic anhydride according to the procedure described in Example 9 results in 1β-methyl-5α-androst-2-ene-1α,17β-diol 17-propionate.

What is claimed is:
1. A compound of the formula

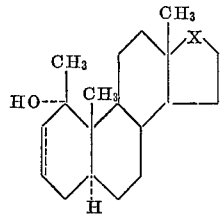

wherein X is selected from the group of radicals consisting of carbonyl and those of the following formula

wherein Z is a member of the class consisting of hydrogen and lower alkyl, Y is hydrogen when Z is lower alkyl, Y is selected from the group consisting of hydrogen and lower alkanoyl when Z is hydrogen and the dotted line indicates the optional presence of a 2,3-double bond.

2. As in claim 1, a compound of the formula

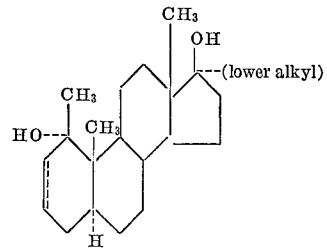

wherein the dotted line indicates the optional presence of a 2,3-double bond.

3. As in claim 1, a compound of the formula

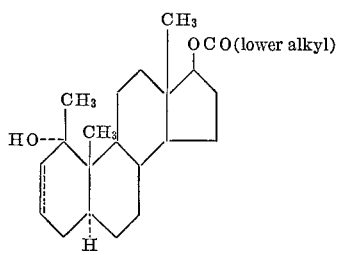

wherein the dotted line indicates the optional presence of a 2,3-double bond.

4. As in claim 1, a compound of the formula

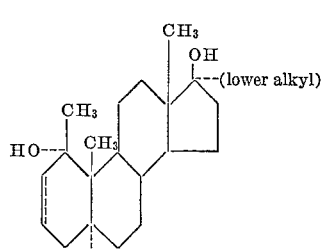

5. As in claim 1, the compound which is 1β,17α-dimethyl-5α-androst-2-ene-1α,17β-diol.
6. As in claim 1, the compound which is 1β,17α-dimethyl-5α-androstane-1α,17β-diol.
7. As in claim 1, the compound which is 1β-methyl-5α-androst-2-ene-1α,17β-diol.
8. As in claim 1, the compound which is 1α-hydroxy-1β-methyl-5α-androst-2-en-17-one.
9. As in claim 1, the compound which is 1β-methyl-5α-androstane-1α,17β-diol.
10. As in claim 1, the compound which is 1α-hydroxy-1β-methyl-5α-androstan-17-one.

References Cited
UNITED STATES PATENTS 3,391,168 7/1968 Counsell et al. _____ 260—397.5
3,257,428 6/1966 Klimstra _____ 260—397.4

LEWIS GOTTS, Primary Examiner

E. G. LOVE, Assistant Examiner

U.S. Cl. X.R.
260—397.5, 999

UNITED STATES PATENT OFFICE
CERTIFICATE OF CORRECTION

Patent No. 3,471,526     Dated October 7, 1969

Inventor(s)     Paul D. Klimstra

It is certified that error appears in the above-identified patent and that said Letters Patent are hereby corrected as shown below:

Column 6, Claim 4, formula

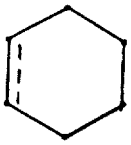

should read

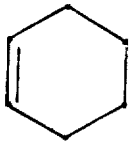

SIGNED AND
SEALED
JAN 6 - 1970

(SEAL)
Attest:

Edward M. Fletcher, Jr.
Attesting Officer

WILLIAM E. SCHUYLER, JR.
Commissioner of Patents